United States Patent
Hashimoto et al.

(10) Patent No.: US 7,458,909 B2
(45) Date of Patent: Dec. 2, 2008

(54) TENSIONER

(75) Inventors: Hiroshi Hashimoto, Osaka (JP); Osamu Yoshida, Osaka (JP); Masaki Kato, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 781 days.

(21) Appl. No.: 10/679,644

(22) Filed: Oct. 6, 2003

(65) Prior Publication Data

US 2004/0092350 A1 May 13, 2004

(30) Foreign Application Priority Data

Nov. 12, 2002 (JP) .............................. 2002-328627

(51) Int. Cl.
*F16H 7/08* (2006.01)
(52) U.S. Cl. ...................................... 474/110
(58) Field of Classification Search ................ 474/101, 474/109, 110, 113, 117, 119
See application file for complete search history.

(56) References Cited

U.S. PATENT DOCUMENTS

| 4,571,226 | A | | 2/1986 | Molloy |
| 5,455,986 | A | | 10/1995 | Gentile |
| 5,967,921 | A | * | 10/1999 | Simpson et al. ............. 474/110 |
| 7,077,772 | B2 | | 7/2006 | Hashimoto |

| 2002/0142871 | A1 | * | 10/2002 | Namie et al. ................. 474/110 |
| 2005/0090342 | A1 | | 4/2005 | Yoshida |

FOREIGN PATENT DOCUMENTS

| EP | 916869 A2 | * | 5/1999 |
| JP | 56052613 | | 3/1979 |
| JP | 11042514 | | 2/1999 |
| JP | 11-223252 | | 8/1999 |
| JP | 2002-286104 | | 10/2002 |

* cited by examiner

*Primary Examiner*—Vicky A Johnson
(74) *Attorney, Agent, or Firm*—Woodling, Krost and Rust

(57) ABSTRACT

A tensioner, in which an inner body and an outer body, which can deal with tensioner mounting forms and tension imparting functions required from various engines can be assembled and its efficient production and reliable assembling without wobbling and clattering can be performed. A body 22 of a tensioner 21 is composed of plastic outer and inner bodies 23 and 24 formed by different members respectively. The outer body 23 is provided with a tensioner mounting means and an inner body fitting hole 23a, the inner body is provided with a plunger accommodating hole 24a, a plunger 26 biased by a compression spring 27 is slidably fitted into the plunger accommodating hole 24a, a bottom portion of the plunger accommodating hole 24a is provided with a check valve 31, and at least the inner body 24, the check valve 31, the compression spring 27 and the plunger 26 form an inner body side unit 33, which imparts proper tension. Further, the inner body 24, which forms the inner body side unit 33 is adapted to be fixed into the inner body fitting hole 23a of the outer body 23 by heat welding.

4 Claims, 7 Drawing Sheets

TENSIONER

This application claims the benefit of Japanese Patent Application 2002-328627 filed Nov. 12, 2002.

TECHNICAL FIELD TO WHICH THE INVENTION PERTAINS

The present invention relates to a tensioner used for imparting proper tension to a wrapping transmission member such as an endless belt or chain or the like.

RELATED ART

A tensioner has been used for imparting proper tension to a wrapping transmission member such as a timing chain, a timing belt or the like, which is used in an engine of an automobile.

Referring to FIGS. 6 and 7, a drive system for a timing chain used in an engine of an automobile will be described. Between a driving side sprocket 101 mounted on a crankshaft of the engine and driven side sprockets 102 mounted on camshafts is being wrapped a timing chain 103 so as to travel in a direction of the arrow. A tensioned side of the timing chain 103 is guided by a guide 104, and a loosened side thereof is guided by a lever 105. Further, in a drive system shown in FIG. 6, a tensioner 1 shown in FIG. 8 is mounted on an end wall 106 of a cylinder block by bolts. Said lever 105 is pressed by the tensioner 1 so that it imparts proper tension to the timing chain 103. A tensioner 21 shown in FIG. 6 is called an inside mount type from the viewpoint of its mounting form. Further, in a drive system shown in FIG. 7, a tensioner 1' is mounted on a protruded wall 107 in a cylinder block by bolts. A lever 105 is pressed by the tensioner 1' so that proper tension is imparted to the timing chain 3. The tensioner 1' is called as so-called an outside mount type from the viewpoint of its mounting form.

FIG. 8 shows one example of a conventional tensioner. A tensioner 1 shown in FIG. 8 is a hydraulic tensioner comprising: a body 2 including a plunger accommodating hole 2a, mounting holes 2b, and an oil supply hole; a plunger 6 having an one end opened hollow portion 6a and slidably fitted into the plunger accommodating hole 2a; a compression spring 7 disposed in the hollow portion 6a and biasing the plunger 6 in the protruding direction; a pressure oil chamber formed of the plunger accommodating hole 2a and the hollow portion 6a; a check valve 11 mounted on a bottom portion in the plunger accommodating hole 2a; and a backing preventing mechanism 12 for preventing the backing of the plunger 6 provided on a front end of the body 2.

Further, in hydraulic plastic tensioners whose bodies were formed of plastic, there is as been known a tensioner comprising a metallic cylinder fitted into a circular hole formed in the body, a plunger inserted into the cylinder so that the front end portion protrudes from the body by a compression spring provided in the cylinder, a pressure oil chamber formed between the interior of the plunger and the cylinder, a check valve mechanism which allows the flow of oil into the pressure oil chamber but blocks backflow, and the like (refer to Japanese Patent Reference 1).

Japanese Patent Reference 1, Japanese Patent Laid-open Publication No. 2002-286104 (on page 2, column 1, lines 1 to 10, FIGS. 1 to 5 and FIG. 7).

Alternatively, in liquid pressure tensioners for a power transmitting chain disposed between rotating members, there has been known a tensioner comprising a housing having a hole, a sleeve member having inner and outer surfaces and accommodated in said hole, a hollow piston having inner and outer surfaces and slidably accommodated inside said sleeve member, and a piston spring, which biases said piston toward said power transmitting chain, in which the inner surface of said sleeve member and the inner surface of said piston are arranged to form a fluid chamber, said fluid chamber is provided to communicate with a fluid source, said housing is made of plastic formed by an injection molding process and said sleeve member is disposed in said housing by an insert forming process (refer to for example Japanese Patent Reference 2).

Japanese Patent Reference, Japanese Patent Laid-open Publication No. Hei 11-223252 (on page 2, column 1, line 1 through on page 2, column 2, line 13, FIGS. 1 to 7).

Problems to be Solved by the Invention

The tensioner has various types. That is, from the viewpoints of mounting forms they have an inside mount type and an outside mount type. Alternatively, from the viewpoints of tension-imparting function, there are various types such as a simple spring type, a hydraulic type, a combination the hydraulic type and a mechanical type, and the like. Any of the conventional tensioner shown in FIG. 8, the tensioner disclosed in the above-mentioned Japanese Patent Reference 1 (Japanese Patent Laid-open Publication No. 2002-286104) and the tensioner disclosed in the above-mentioned Japanese Patent Reference 2 (Japanese Patent Laid-open Publication No. Hei 11-223252) are those of types of combinations of a hydraulic type and a mechanical type. In these tensioners the position of a mounting hole formed in the body (housing) and the position of an oil supply hole are determined by requirement of each engine. Therefore, when requirements of engines are different, the entire tensioner including the body (housing) must be newly produced. In such a case, separate working and assembling lines are needed every individual tensioner and problems of the equipment adding cost and the space of a factory have occurred every time when a new tensioner starts up.

Accordingly, the object of the present invention is to solve the above-mentioned problems and to provide a tensioner, in which an inner body and an outer body, which can deal with tensioner mounting forms and tension imparting functions required from various engines can be assembled and its efficient production and reliable assembling without wobbling can be performed.

Means for Solving the Problems

To solve the above-mentioned problems according to the invention of claim 1, a tensioner used for imparting proper tension to a trailing transmission member, is characterized in that a body of said tensioner is composed of plastic outer and inner bodies formed by different members respectively; said outer body is provided with a tensioner mounting means and an inner body fitting hole, said inner body is provided with a plunger accommodating hole, a plunger biased by a compression spring is slidably fitted into said plunger accommodating hole, a bottom portion of said plunger accommodating hole is provided with a check valve, and at least said inner body, said check valve, said compression spring and said plunger form an inner body side unit, which imparts proper tension; and said inner body, which forms said inner body side unit is adapted to be fixed into the inner body fitting hole of said outer body by heat welding.

Further, according to the invention of claim 2, the above-mentioned problems are solved by the fact that said heat welding is ultrasonic deposition in the tensioner of claim 1.

According to the invention of claim 3, the above-mentioned problems are solved by the fact that a bushing including a mounting hole, which is said tensioner mounting means, is heat welded onto said outer body in the tensioner of claim 1, According to the invention of claim 4, the above-mentioned problems are solved by the fact that said heat welding is ultrasonic welding in the tensioner of claim 3.

According to the invention of clam 1, since the portion having a tension imparting function is unitized in an inner body side, the inner body forming an inner body side unit can be unitized in a simple form, and the working and assembly lines are unitized so that the reduction of equipment cost and space due to the commonality of equipment can be attained.

Further, since different portions in the individual tensioners (for example, mounting hole, mounting surface, oil supply hole and the like) are formed in the outer body, various tensioners can be effectively produced by fixing the inner body and the outer body, which form an inner body side unit.

Further, since the assembling (fixing) of the outer body and the inner body side unit is performed by heat welding, if simple equipment is provided on even a place other than a factory, it can be effectively performed.

According to the invention of claim 2, since the assembling of the outer body and the inner body side unit is performed by ultrasonic welding, the assembling thereof can be further effectively performed.

According to the invention of claim 3, since the bushing including a mounting hole, which is a tensioner mounting means, is heat welded onto the outer body, the fabrication of the outer body can be effectively performed.

According to the invention of claim 4, since the bushing including a mounting hole, which is a tensioner mounting means, is ultrasonic welded onto the outer body, the fabrication of the outer body can be further effectively performed.

The invention will be better understood when reference is made to the BRIEF DESCRIPTION OF THE DRAWINGS, DETAILED DESCRIPTION OF THE INVENTION and CLAIMS which follow hereinbelow.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

Figure 1:
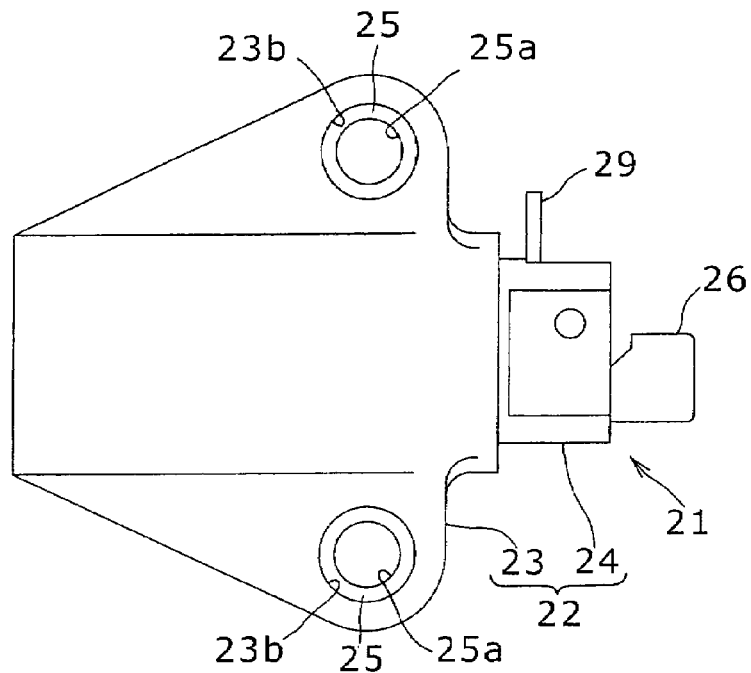
FIG. 1 is a front view of a tensioner, which is one Example, according to the present invention.
Figure 2:
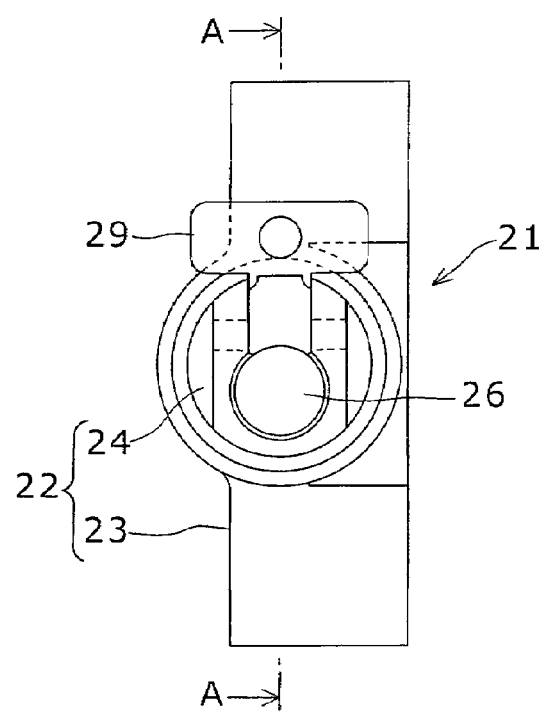
FIG. 2 is a right side view of the tensioner shown in FIG. 1.
Figure 3:
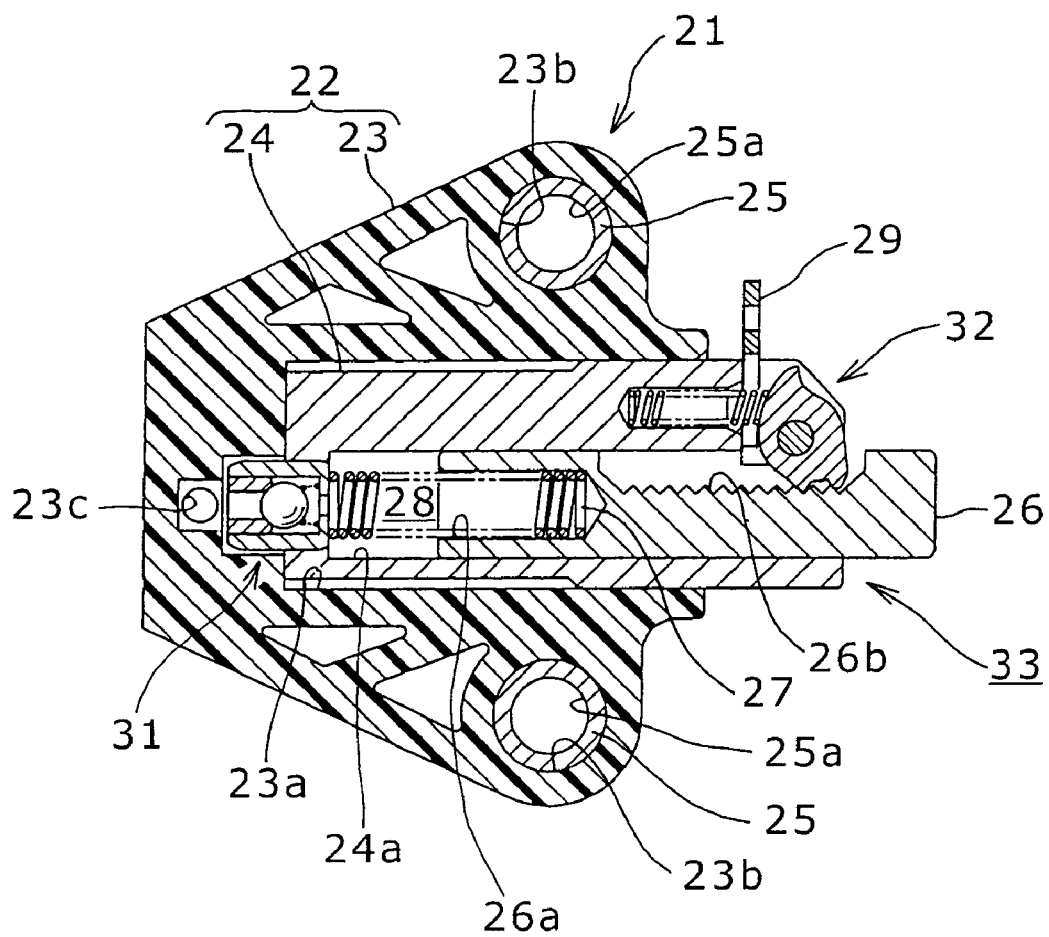
FIG. 3 is an A-A cross-sectional view in FIG. 2.
Figures 4A, 4B:
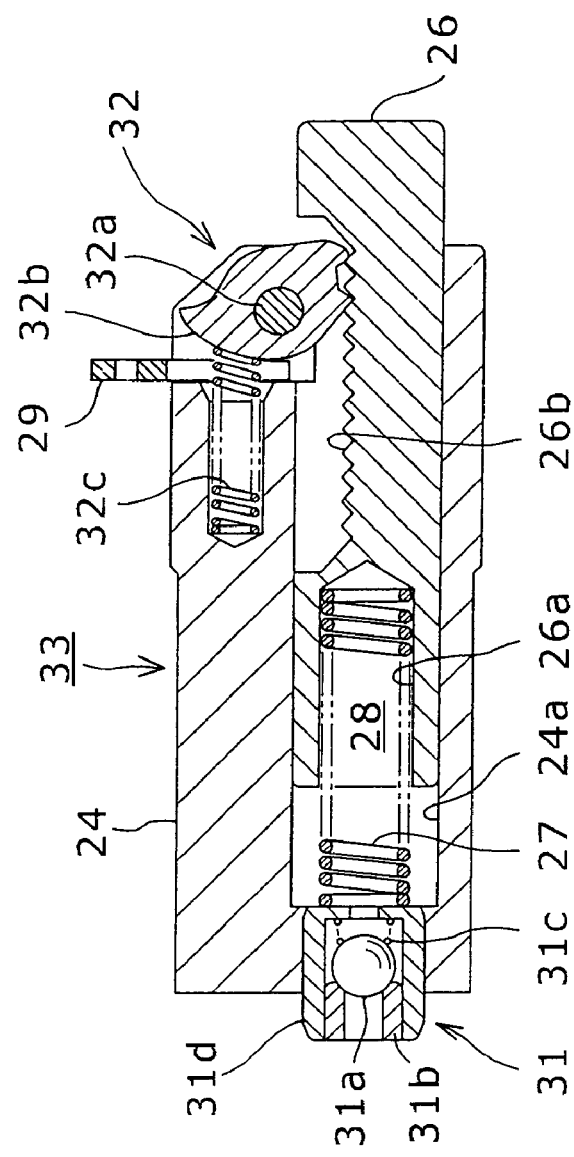
FIG. 4. is an inner body side unit forming the tensioner shown in FIG. 1, particularly, (A) is a left end view and (B) is a cross-sectional.
Figure 5:
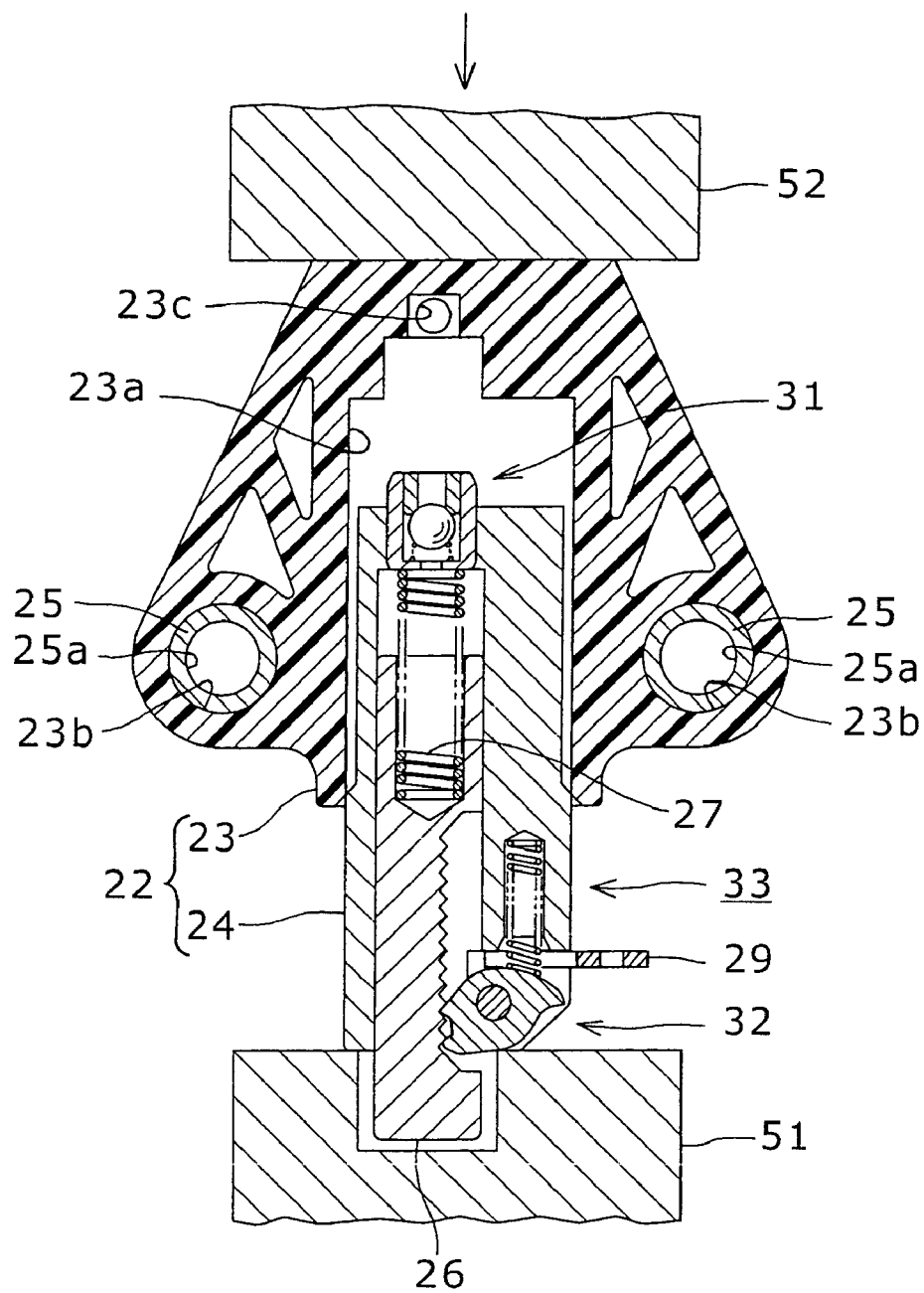
FIG. 5 is a cross-sectional view showing a process of incorporating an inner body side unit to an outer body of the tensioner shown in FIG. 1.
Figure 6:
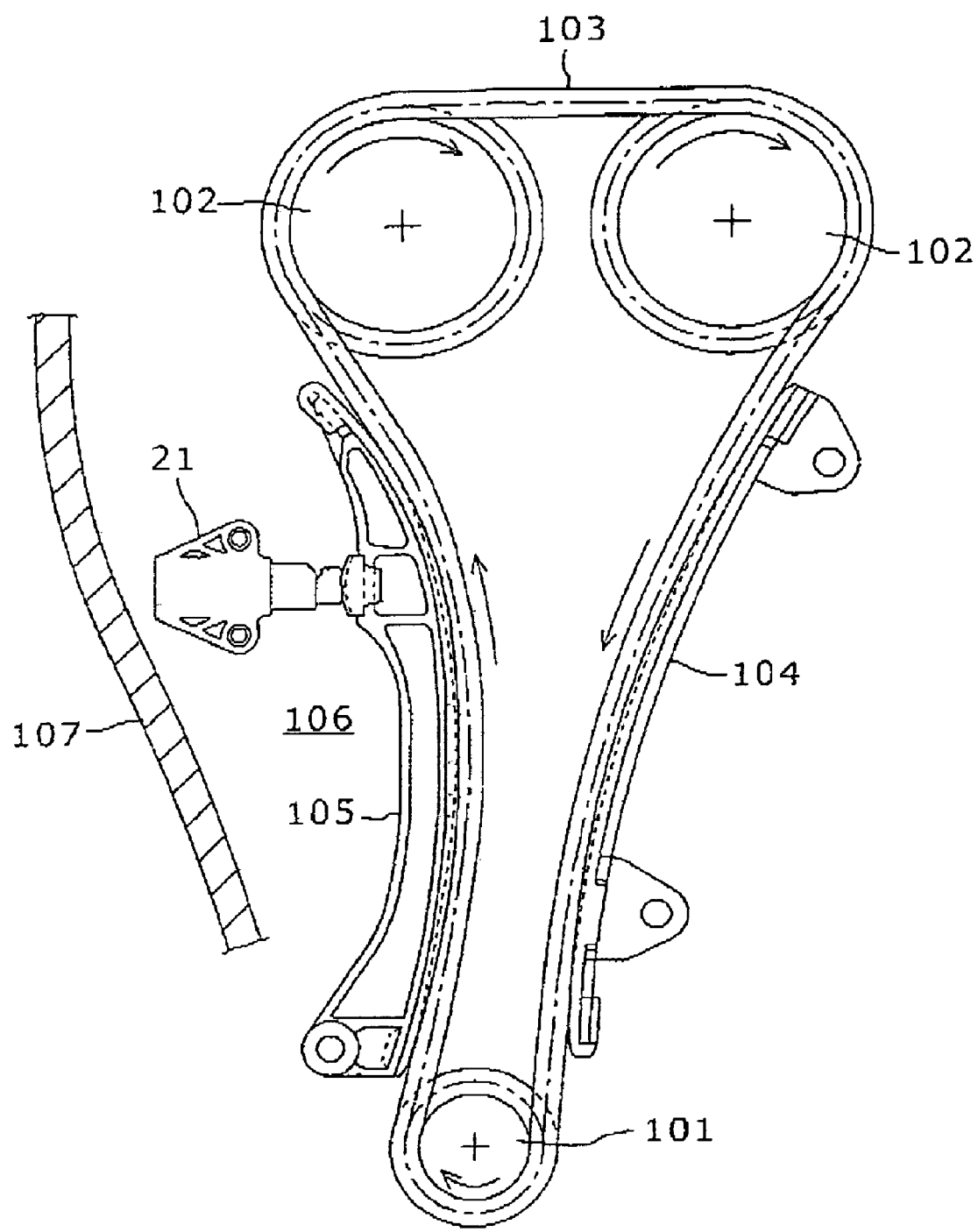
FIG. 6 is a schematic view showing an example of a tensioner mounting form in a drive system for a timing chain used in an automobile engine.
Figure 7:
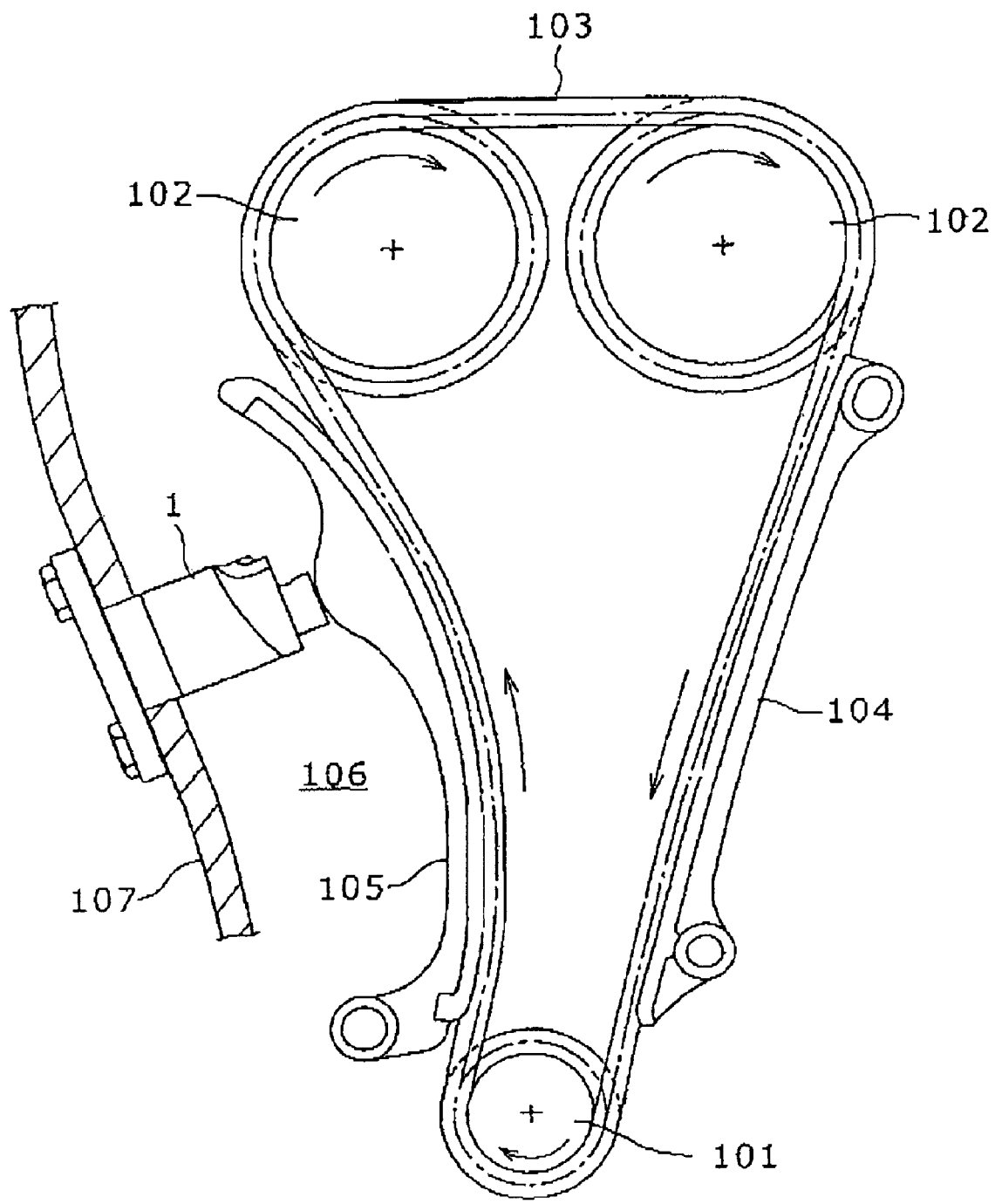
FIG. 7 is a schematic view showing another example of a tensioner mounting form in a drive system for a timing chain used in an automobile engine
Figure 8:
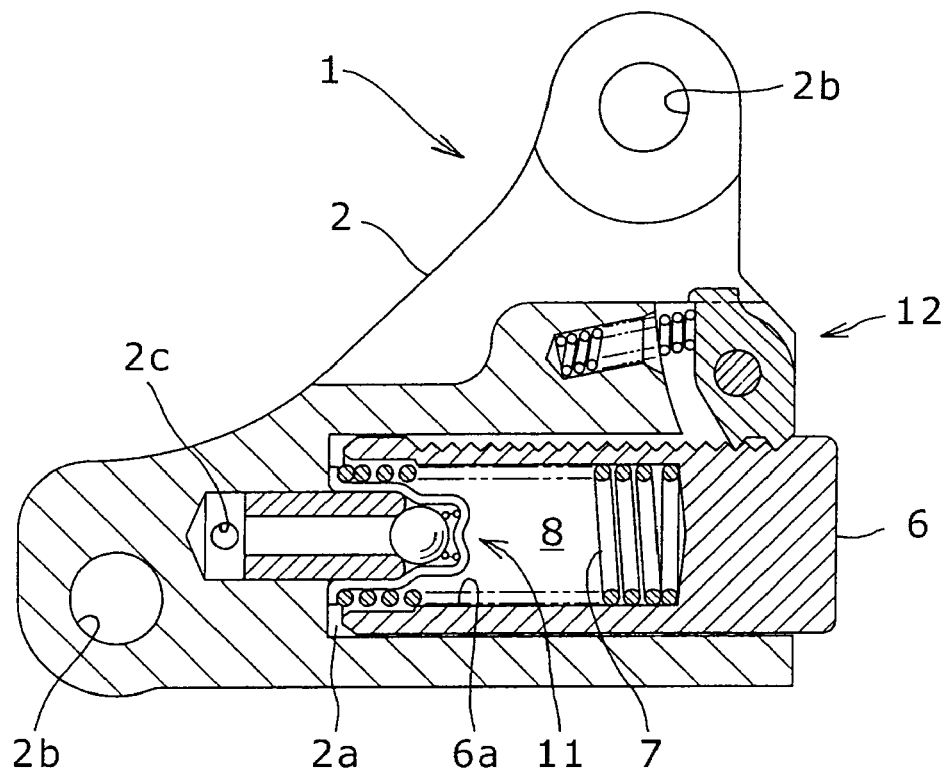
FIG. 8 is a cross-sectional view showing one example of a conventional tensioner.

Preferable embodiments of the present invention will now be described with reference to drawings. FIG. 1 is a front view of a tensioner according to an embodiment of the present invention. FIG. 2 is a right side view of the tensioner shown in FIG. 1. FIG. 3 is the A-A cross-sectional view in FIG. 2. FIG. 4 shows an inner body side unit forming the tensioner shown in FIG. 1, and particularly, (A) is a left end view and (B) is a cross-sectional view. FIG. 5 is a cross-sectional view showing a process of incorporating an inner body side unit into the outer body of the tensioner shown in FIG. 1.

In a tensioner 21 of the present Example shown in FIGS. 1 to 3, the body 22 of the tensioner 21 comprises an outer body 23 and an inner body 24, which are formed of different members respectively.

The outer body is made of plastic and is molded by an injection molding process. The outer body 23 includes an inner body fitting hole 23a, bushing mounting holes 23b and an oil supply hole 23c. To each of the bushing holes 23b is fixed a bushing 25 having a mounting hole 25a by ultrasonic welding, which will be described later. Further, the bushing 25 having the mounting hole 25a is made of plastic and forms a tensioner mounting means for mounting the tensioner 21 on an end wall 106 of a cylinder block by bolts.

The inner body 24 is made of metal such as an aluminum alloy or the like and is formed by a die casting process. The inner body 24 includes a plunger accommodating hole 24a, and in this plunger accommodating hole 24a is slidably fitted into a plunger 26. In this plunger 26 is formed an one end opened hollow portion 26a, and in this hollow portion 26a is accommodated a compression spring 27, which biases the plunger 26 in the protruding direction. Then, the plunger accommodating hole 24a and the hollow portion 26a form a pressure oil chamber 28.

Further, a bottom portion of the plunger accommodating hole 24a in the inner body 24 includes a check valve 31, as shown in FIG. 3. The check valve 31 comprises a ball 31a, a seat 31b on which the ball 31a is seated, a spring 31c, which biases the ball 31a and a retainer 31d, which supports the spring 31c as shown in FIG. 4. The seat 31b is press-fitted into an inner circumferential surface of the retainer 31d, and the retainer 31d is press-fitted into the bottom portion of the plunger accommodating hole 24a. Further, an end of the compression spring 27, which biases the plunger 26 in the protruding direction is supported by an end surface of the retainer 31d.

A front end of the inner body 24 is provided with a movement-backward preventing mechanism 32, which prevents the movement backward of the plunger 26. The movement-backward preventing mechanism 32 comprises a rack 26b formed a portion of the outer circumference of the plunger 26, a pawl body 32b pivotally supported by a pivot shaft 32a in a cutout groove formed in the front end of the inner body 24, and a spring 32c, which biases so that the pawl of the pawl body 32b locks the rack 26b. This movement-backward preventing mechanism 32 has functions of allowing the movement forward (protrusion) of the plunger 26 and of regulating the movement backward, which exceeds a range of the backlash. Further, between the bottom surface of the cutout groove formed on the front end of the inner body 24 and the back surface of the pawl body 32b is inserted a stopper 29 having a bifurcated leg, and the insertion of the stopper 29 prevents the plunger 26 from protruding in a state before mounting the tensioner 21.

As described above, the plunger 26, the compression spring 27, the check valve 31 and the movement-backward preventing mechanism 32 are all incorporated into the inner body 24. Then, the inner body 24, the plunger 26, the compression 27, the check valve 31, and the movement-backward preventing mechanism 32 form an inner body side unit 33. Thus, this inner body side unit 33 has a proper tension imparting function, which imparts proper tension to a timing chain 103.

Next, the assembling of the tensioner 21 of the present Example shown in FIGS. 1 to 3 will be described.

First, the inner body 24, the plunger 26, the compression 27, the check valve 31 and the movement-backward preventing mechanism 32 are assembled with each other to complete the inner body side unit 33.

Then, the inner body side unit 33 is press-fitted into the outer body 23, and a press-fitted portion of the inner body fitting hole 23a in the outer body 23 is fused and softened to fix by an ultrasonic welding machine. That is, as shown in FIG. 5, the inner body 24 forming the inner body side unit 33 is disposed on a base of the ultrasonic welding machine and is secured thereto by a tool (not shown).

Then, the inner body fitting hole 23a in the outer body 23 is inserted to the inner body 24 forming the inner body side unit 33. After that a horn of the ultrasonic welding machine is arranged on the top portion of the outer body 23. Then, a power supply, which activates the horn 52, is activated, and while generating ultrasonic vibration up and down in the horn 52, the front end surface of the horn 52 is pressed against the rear end surface (top surface) of the outer body 23. Then, while applying the pressing force in the direction of the arrow (FIG. 5) the inner body 24 is gradually press-fitted into the inner body fitting hole 23a in the outer body 23.

In this case frictional heat is generated at the contact portion that is the press-fitting portion between the inner body 24 and the inner body fitting hole 23a. Since the outer body is made of plastic, the press-fitting portion is fused and softened so that the inner body 24 is strongly fixed into the inner body fitting hole 23a.

In this case, it is preferable to previously knurl the press-fitting portion of the inner body 24, since the inner body 24 is strongly fixed.

It is noted that in the above-mentioned tensioner 21 of the Example shown in FIG. 5, although the inner body 24 forming the inner body side unit 33 was disposed on the base 51 of the ultrasonic welding machine and the outer body 23 was arranged on the horn 52 side of the ultrasonic welding machine, the outer body 23 may be disposed on the base 51 and the inner body 24 forming the inner body side unit 33 may be arranged on the horn 52 side.

Further, the fixing of the inner body 24 into the inner body fitting hole 23a by heat welding can be performed by a process other than the ultrasonic welding. For example as the heat welding means the radio frequency induction heating can be utilized. That is when the inner body 24 is made of metal, it is surrounded by a radio frequency induction coil, so that the outer circumference of the inner body 24 is rapidly heated by radio frequency induction heating. Then the heated inner body 24 is press-fitted into the inner body fitting hole 23a. In this case as well, the inner circumferential surface of the inner body fitting hole 23a is fused and softened to heat weld by the heat of the inner body 24.

Although not shown, when a bushing 25 for mounting the tensioner 21 of the Example on an end wall of a cylinder block of the engine is fixed into the bushing-fitting hole 23, an ultrasonic welding machine can be also used. That is onto a base of the ultrasonic welding machine is fixed the outer body 23. Then, into the bushing mounting hole 23b of the outer body 23 is inserted the lower portion of the bushing 25, and on the top of the bushing 25 is disposed a horn of an ultrasonic welding machine. Then while generating ultrasonic vibration up and down, the front end surface of the horn is pressed against the top end surface of the bushing 25. Then while applying pressing force downward, the bushing is gradually press-fitted into the bushing mounting hole 23b of the outer body 23. In this case, frictional heat is generated at the contact surface that is the press-fitting portion between the bushing 25 and the bushing mounting hole 23b. Since the outer body 23 is made of plastic the press-fitting portion is fused and softened, so that the bushing 25 is strongly fixed into the bushing mounting hole 23b. In this case, it is preferable to previously knurl the press-fitting portion of the bushing 25, since the busing 25 is strongly fixed.

It is noted that although in the above-mentioned example the outer body 23 was disposed on the base of the ultrasonic welding machine, the bushing 25 may be disposed on the base and the outer body 23 may be arranged on the horn side.

When the bushing 25 is fixed into the bushing mounting hole 23b of the outer body 23, the above-mentioned radio frequency induction heating can be also utilized as a heat welding means.

The above-described tensioner 21 is an inside mount type and is made of plastic. Further, the inner body side unit 33 is a combination type of a hydraulic type and a mechanical type.

In the tensioners according to the present invention, the inner body side unit can take a hydraulic type or spring type or the like if it has a proper tension imparting function. Further, the outer body uses different mounting means such as a tensioner mounting hole and the like in accordance with the inside mount type or the outside mount type. In the tensioner to which the present invention is applied, the inner body side unit has a proper tension imparting function, and the outer body forms different portions (for example, mounting hole, mounting surface, oil supply hole and the like).

The thus formed tensioner 21 of the Example has the following effects.

(1) By combining the inner body 24 forming the inner body side unit 33 and the outer body forming different portions respectively to fix them, tensioners, which are capable of dealing with tensioner mounting forms and tension imparting functions, can be effectively produced.

(2) The wobbling between the inner body 24 forming the inner body side unit 33 and the inner body fitting hole 23a of the outer body 23 can be lost (3) By press-fitting the inner body into the inner body fitting hole 23a of the outer body 23 while fusing and softening the press-fitting portion of the inner body fitting hole 23a of the outer body 23, a range of press-fitting interference control values can be increased, an increase in a tolerance of the outer diameter of the inner body 24 and a decrease of the number of repairing the mold are possible and a tolerance of the outer diameter of the inner body 24 can be increased. Thus, a polishing process can be omitted and the production cost can be reduced.

(4) Since a step of setting the inner body 24 to a plastic forming mold is not needed, the molding cycle time can be reduced and the cost can be reduced.

(5) Since the assembling contents are the same as in simple press-fitting by a press, assembling technique is not required.

(6) By fusing and softening the press-fitting portion of the inner body fitting hole 23a and the outer body 23, a gap between the inner body forming the inner body side unit 33 and the inner body fitting hole 23a of the outer body 23 can be completely sealed. Thus the oil leakage from the gap can be reliably prevented, and the addition of parts such as an O ring for preventing the oil leakage and the like is not needed.

It is noted that although in the Example as a wrapping transmitting member, to which proper tension is imparted, the timing chain was described, a chain other than the timing chain may be used, and a timing belt or the like may be used.

Effects of the Invention

As described above, the effects exhibited by the tensioner of the invention are as follows.

In the tensioner of claim 1, the following effects can be obtained.

(1) By combining the inner body forming the inner body side unit and the outer body forming different portions respectively to fix them, tensioners, which are capable of dealing with tensioner mounting forms and tension imparting functions, can be effectively produced.

(2) The wobbling between the inner body forming the inner body side unit and the inner body fitting hole of the outer body can be lost (3) By press-fitting the inner body into the inner body fitting hole of the outer body while fusing and softening the press-fitting portion of the inner body fitting hole of the outer body, a range of press-fitting interference control values can be increased, an increase in a tolerance of the inner body fitting hole of the inner body and a decrease of the number of repairing the mold are possible and a tolerance of the outer diameter of the inner body can be increased. Thus, a polishing process can be omitted and the production cost can be reduced.

(4) Since a step of setting the inner body to a plastic forming mold required for a conventional insert molding process, is not needed, the molding cycle time can be reduced and the cost can be reduced.

(5) Since the assembling contents of the inner body into the inner body fitting hole are the same as in simple press-fitting by a press, special assembling technique is not required.

(6) By fusing and softening the press-fitting portion of the inner body fitting hole and the outer body, a gap between the inner body forming the inner body side unit and the inner body fitting hole of the outer body can be completely sealed. Thus the oil leakage from the gap can be reliably prevented, and the addition of parts such as an O ring for preventing the oil leakage and the like is not needed According to the tensioner of claim 2, the heat welding of the inner body into the inner body fitting hole is ultrasonic welding. Accordingly, in addition to the above-mentioned effects the press-fitting portion in the inner body fitting hole is fused and softened. Thus the incorporating operation of the inner body into the inner body fitting hole becomes the same as in the simple press-fitting by a press. Thus, special assembling technique is unnecessary.

According to the tensioner of claim 3, in addition to the above-mentioned effects, the following effects are obtained.

(1) Since the bushing is heat welded into the bushing mounting hole (press-fitting portion) of the outer body, wobbling between the bushing and the outer body can be lost.

(2) By press-fitting the bushing into the bushing inserting hole (press-fitting portion) of the outer body while fusing and softening the bushing inserting hole the outer body, a range of press-fitting interference control values can be increased, an increase in a tolerance of the bushing inserting hole of the outer body and a decrease of the number of repairing the mold are possible and a tolerance of the outer diameter of the bushing can be increased. Thus, a polishing process can be omitted and the production cost can be reduced.

(3) Since the bushing is heat welded into the bushing inserting hole of the outer body, the setting of the bushing to a plastic forming mold is not needed unlike a insert molding process, and the injection molding cycle time for the outer body can be reduced and the production cost can be reduced.

According to the tensioner of claim 4, since the heat welding of the bushing into the bushing inserting hole (press-fitting portion) is ultrasonic welding, in addition to the above-mentioned effects, the incorporating operation of the bushing into the bushing inserting hole of the outer body is the same as simple press-fitting by a press. Thus, a special assembling technique is not required.

DESCRIPTION OF REFERENCE NUMERALS

21: Tensioner
22: Body
23: Outer body
23a: Inner body fitting hole
23b: Bushing-mounting hole
23c: Oil supply hole
24: Inner body
24a: Plunger accommodating hole
25: Bushing
25a: Mounting hole
26: Plunger
26a: Hollow portion
26b: Rack
27: Compression spring
28: Pressure oil chamber
29: Stopper
31: Check valve
31a: Ball
31b: Seat
31c: Spring
31d: Retainer
32: Movement backward preventing mechanism
32a: Pivot shaft
32b: Pawl body
32c: Spring
33: Inner body side unit
51: Base
52: Horn
101: Driving side sprocket
102: Driven side sprocket
103: Timing chain (wrapping transmission member)
104: Guide
105: Lever
106: End wall of cylinder block
107: Protruded wall of cylinder block While the invention has been described herein by way of example, those skilled in the art will recognize that certain changes and modifications may be made to the invention as described herein by way of example without departing from the spirit and scope of the appended claims.

We claim:

1. A tensioner used for imparting proper tension to a wrapping transmission member, comprising:
    a plastic outer body;
    said plastic outer body includes a tensioner mounting means;
    said plastic outer body includes an eccentric inner body unit fitting hole;
    said eccentric inner body unit fitting hole of said plastic outer body includes cylindrically shaped side walls forming a counterbore and a shoulder therein and a second eccentric counterbore therein;

an inner body unit;

said inner body unit includes an inner body, an eccentric plunger accommodating hole within said inner body, a compression spring, a check valve, a plunger and a ratchet; said eccentric plunger accommodating hole includes cylindrically shaped walls forming a counterbore and a shoulder therein and a second bore therethrough; said check valve is press-fit into and resides partially within said second bore of said eccentric plunger accommodating hole of said inner body of said inner body unit; said check valve includes a portion thereof which protrudes eccentrically from said inner body of said inner body unit; said plunger slidingly engages said counterbore of said eccentric plunger accommodating hole and said spring resides in said counterbore of said eccentric plunger accommodating hole intermediate said check valve and said plunger; said plunger is retained in said counterbore of said eccentric plunger accommodating hole of said inner body of said inner body unit by said ratchet;

said inner body of said inner body unit includes a generally cylindrically shaped exterior surface terminating in a planar end surface; said portion of said check valve which protrudes eccentrically from said inner body of said inner body unit includes a generally cylindrically shaped exterior surface;

said inner body unit is inserted into and partially resides in said counterbore of said eccentric inner body fitting hole of said plastic outer body;

said portion of said check valve which protrudes eccentrically from said inner body of said inner body unit resides in but does not engage said second eccentric counterbore of said eccentric inner body fitting hole of said plastic outer body;

a portion of said generally cylindrically shaped exterior surface of said inner body of said inner body unit interengages said counterbore of said cylindrically shaped eccentric inner body fitting hole of said plastic outer body;

said portion of said generally cylindrically shaped exterior surfaces of said inner body of said inner body unit are completely sealed and affixed by heat welding to said cylindrically shaped eccentric inner body fitting hole of said plastic outer body;

said planar end surface of said inner body of said inner body unit interengages said shoulder of said counterbore of said cylindrically shaped eccentric inner body fitting hole of said plastic outer body;

said planar end surface of said inner body of said inner body unit is completely sealed and affixed by heat welding against and to said shoulder of said counterbore of said cylindrically shaped eccentric inner body fitting hole of said plastic outer body; and, said insertion, affixation and sealing of said inner body unit in said counterbore of said eccentric inner body fitting hole of said plastic outer body and said orientation of said protruding portion of said check valve within but not engaging said second eccentric counterbore of said plastic outer body prohibits rotation of said inner body unit with respect to said plastic outer body which may tend to occur due to engine forces.

2. The tensioner according to claim 1, wherein said heat welding is ultrasonic deposition.

3. The tensioner mounting means according to claim 1, wherein said tensioner mounting means includes a bushing and a mounting hole in said outer body and said bushing is heat welded onto said outer body.

4. The tensioner according to claim 3, wherein said heat welding is ultrasonic welding.

\* \* \* \* \*